United States Patent
Russell

(10) Patent No.: US 9,616,568 B1
(45) Date of Patent: Apr. 11, 2017

(54) GENERATING A GRASP AFFORDANCE FOR AN OBJECT BASED ON A THERMAL IMAGE OF THE OBJECT THAT IS CAPTURED FOLLOWING HUMAN MANIPULATION OF THE OBJECT

(71) Applicant: X Development LLC, Mountain View, CA (US)

(72) Inventor: Jared Stephen Russell, San Francisco, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 44 days.

(21) Appl. No.: 14/835,424

(22) Filed: Aug. 25, 2015

(51) Int. Cl.
| B25J 9/16 | (2006.01) |
| B25J 19/02 | (2006.01) |
| B25J 9/00 | (2006.01) |
| B25J 11/00 | (2006.01) |
| B25J 9/06 | (2006.01) |

(52) U.S. Cl.
CPC ........... B25J 9/1612 (2013.01); B25J 9/0081 (2013.01); B25J 9/1697 (2013.01); Y10S 901/03 (2013.01)

(58) Field of Classification Search
CPC .............................. B25J 9/1612; B25J 9/1967
See application file for complete search history.

(56) References Cited

U.S. PATENT DOCUMENTS

| 7,801,644 | B2 | 9/2010 | Bruemmer et al. | |
| 8,244,402 | B2 | 8/2012 | Wells et al. | |
| 8,272,278 | B2 | 9/2012 | Loeb et al. | |
| 8,447,863 | B1 * | 5/2013 | Francis, Jr. ............. | H04W 4/02 707/724 |
| 8,452,451 | B1 * | 5/2013 | Francis, Jr. ............ | B25J 9/1658 700/245 |
| 8,639,644 | B1 | 1/2014 | Hickman et al. | |
| 2008/0133058 | A1 * | 6/2008 | Ohno ..................... | B25J 9/1612 700/259 |
| 2011/0071675 | A1 * | 3/2011 | Wells ................... | G06K 9/3216 700/250 |
| 2013/0184860 | A1 * | 7/2013 | Ota ........................ | B25J 9/1669 700/245 |
| 2013/0231779 | A1 | 9/2013 | Purkayastha et al. | |
| 2014/0277742 | A1 | 9/2014 | Wells et al. | |
| 2015/0002391 | A1 | 1/2015 | Chen | |

* cited by examiner

Primary Examiner — Dale Moyer
(74) Attorney, Agent, or Firm — Middleton Reutlinger

(57) ABSTRACT

Methods, apparatus, and computer readable storage media related to utilizing a thermographic camera to capture at least one thermal image of an object following human manipulation of the object, and generating a grasp affordance for the object based on the temperatures indicated by the captured thermal image. The generated grasp affordance may be utilized, directly or indirectly, by one or more robots for determining grasping parameters for manipulating the object and/or other objects that are similar to the object.

21 Claims, 7 Drawing Sheets

GENERATING A GRASP AFFORDANCE FOR AN OBJECT BASED ON A THERMAL IMAGE OF THE OBJECT THAT IS CAPTURED FOLLOWING HUMAN MANIPULATION OF THE OBJECT

BACKGROUND

Many robots include end effectors that enable the robots to grasp various objects and manipulate those objects. Manipulating an object may include, for example, picking up the object or otherwise moving the object without necessarily picking it up (e.g., rotating a door knob, pulling a lever, moving an object across a surface). For example, a robot may utilize a gripper end effector such as an "impactive" gripper or "ingressive" gripper (e.g., physically penetrating an object using pins, needles, etc.) to pick up an object from a first location, move the object to a second location, and drop off the object at the second location. Some additional examples of robot end effectors that may grasp objects include "astrictive" end effectors (e.g., using suction or vacuum to pick up an object) and one or more "contigutive" end effectors (e.g., using surface tension, freezing or adhesive to pick up an object), to name just a few.

While humans innately know how to correctly grasp many different objects, determining an appropriate location to grasp an object for manipulation of that object may be a difficult task for robots. For example, some robots may rely on applying a color image of an object captured by a camera of the robot to a convolutional neural network that has been trained using color images labeled with valid grasps to determine a grasp for the object. However, the labeled images utilized to train the convolutional neural network are typically hand labeled, which may be a time-consuming task and/or may not encompass many objects that may be encountered by robots. Moreover, such approaches may be computationally slow and/or inaccurate. Also, for example, some robots may rely on applying a "brute force" approach to a 3D model of an object to determine a grasp for the object. However, such approaches may be computationally slow and/or inaccurate. Additional and/or alternative drawbacks of the aforementioned techniques and/or other techniques may be presented.

SUMMARY

Humans are often warmer than various environmental objects and may leave a transient heat signature on objects they manipulate—a heat signature that remains detectable after the human is no longer touching the object (e.g., often at least as long as a few seconds after). The present disclosure is generally directed to utilizing a thermographic camera to capture at least one thermal image of an object following human manipulation of the object, and generating a grasp affordance for the object based on the temperatures indicated by the captured thermal image. The grasp affordance defines one or more portions of the object touched by the human during the manipulation of the object and may be utilized, directly or indirectly, by one or more robots for determining grasping parameters for manipulating the object and/or other objects that are similar to the object.

In some implementations, the thermographic camera may be used to capture at least one "manipulation influenced" thermal image of the object when a heat signature of the object is influenced by human manipulation of the object (e.g., within a threshold amount of time of cessation of the human manipulation) and to capture at least one "non-influenced" thermal image of the object when the heat signature of the object is not influenced by human manipulation of the object (e.g., before the human manipulation, or after cessation of the human manipulation and after a threshold amount of time has passed to let the heat signature "wear off"). In some of those implementations, a grasp affordance for the object may be generated based on differences between the manipulation influenced thermal image and the non-influenced thermal image, such as differences in temperatures that are indicated by the images. For example, a grasp affordance may be generated that defines portions of the object based on those portions having an indicated temperature difference between the manipulation influenced thermal image and the non-influenced thermal image that satisfies a threshold.

One or more generated grasp affordances may be utilized for various purposes. For example, a grasp affordance for an object may be generated based on a thermal image of the object that is captured by a robot following human manipulation of the object, and the generated grasp affordance used by the robot to generate one or more grasping parameters for grasping of that particular object by an end effector of the robot. In some of those implementations, the grasp affordance may be utilized as one of the grasping parameters (e.g., at least one of the portions defined by the grasp affordance may be a "reference point" for positioning the end effector), or the grasp affordance may be utilized as a cue for determining grasping parameters (e.g., an "initial search space" for a "brute force" approach may be based on the grasp affordance). As another example of a use for generated grasp affordances, multiple grasp affordances generated based on thermal images from one or more robots and/or other agents can be used to populate a library of grasp affordances for objects. Grasp affordances of the populated library can then be utilized directly by robots to identify one or more grasp affordances for each of a plurality of objects (e.g., an "initial search space" for a "brute force" approach on an object may be based on the grasp affordance(s) for that object) and/or can be used to generate training examples for training a machine learning system (e.g., a convolutional neural network) to detect one or more grasps for objects.

In some implementations, a method is provided that includes detecting an object based on data from one or more sensors of a robot and capturing, by a thermographic camera of the sensors of the robot, at least one thermal image of the object and at least one additional thermal image of the object. The thermal image is captured prior to expiration of a threshold amount of time following completion of manipulation of the object by a human and the additional thermal image is captured either before the manipulation of the object by the human or after expiration of the threshold amount of time following the completion of the manipulation of the object by the human. The method further includes generating, by one or more processors, a grasp affordance for the object based on differences in temperatures indicated by the thermal image and the additional thermal image. The generated grasp affordance defines one or more portions of the object touched by the human during the manipulation of the object by the human. The method further includes storing the grasp affordance for the object in a non-transitory computer readable storage medium for determining one or more grasping parameters for manipulating the object or other objects that are similar to the object.

This method and other implementations of technology disclosed herein may each optionally include one or more of the following features.

In some implementations, generating the grasp affordance for the object includes: determining the differences in the temperatures between the one or more portions in the thermal image and the one or more portions in the additional thermal image and defining the one or more portions of the object based on the differences in the temperatures satisfying a threshold. In some of those implementations, the grasp affordance for the object defines the one or more portions of the object touched by the human during the manipulation and defines additional portions of the object. In some versions of those implementations, the grasp affordance for the object comprises one or more geometric shapes that encompass the one or more portions and the additional portions.

In some implementations, the method further includes assigning the grasp affordance to corresponding portions of the object in a non-thermographic image of the object that is captured by a non-thermographic camera of the sensors of the robot. In some of those implementations, storing the grasp affordance for the object includes storing the assignment of the grasp affordance to the corresponding portions of the object in the non-thermographic image of the object.

In some implementations, the method further includes assigning the grasp affordance to corresponding portions of the object in a three dimensional model of the object. In some of those implementations, storing the grasp affordance for the object includes storing the assignment of the grasp affordance to the corresponding portions of the object in the three dimensional model of the object.

In some implementations, the method further includes determining an identifier of the object based on the data from the one or more of the sensors of the robot; and assigning the grasp affordance to the identifier of the object.

In some implementations, the method further includes determining, by the robot, an indication of the completion of the manipulation of the object by the human based on the data from the one or more sensors of the robot and selecting the thermal image for generating the grasp affordance based on determining the thermal image was captured following the indication of the completion of the manipulation of the object. In some of those implementations, the method further includes determining, by the robot, an indication of a start of the manipulation of the object by the human based on the data from the one or more sensors of the robot and selecting the additional thermal image for generating the grasp affordance based on determining the thermal image was captured prior to the indication of the start of the manipulation of the object.

In some implementations, the method further includes generating grasping parameters for the object based on the grasp affordance and positioning a grasping end effector of the robot based on the grasping parameters.

In some implementations, the method further includes generating a training example based on the grasp affordance and providing the training example for training of a convolutional neural network to determine grasping parameters for manipulating objects.

In some implementations, detecting the object based on the data from the one or more of the sensors of the robot comprises detecting the object based on data from a non-thermographic camera of the sensors. In some implementations, detecting the object based on the data from the one or more of the sensors of the robot comprises detecting the object based on data from the thermographic camera.

In some implementations, a method is provided that includes: capturing, by a thermographic camera, at least one thermal image of an object following manipulation of the object by a human; generating, by one or more processors, a grasp affordance for the object based on one or more temperatures indicated by the thermal image, the grasp affordance defining one or more portions of the object touched by the human during the manipulation of the object by the human; and storing the grasp affordance for the object in a non-transitory computer readable storage medium for determining one or more grasping parameters for one or more robots in manipulating the object or other objects that are similar to the object.

This method and other implementations of technology disclosed herein may each optionally include one or more of the following features.

In some implementations, generating the grasp affordance for the object includes defining the one or more portions of the object based on the temperatures indicated in the one or more portions in the thermal image being at least a threshold temperature greater than the temperatures indicated in other portions of the thermal image. In some of those implementations, generating the grasp affordance for the object further includes defining the one or more portions of the object based on the one or more portions being at least a threshold size.

In some implementations, the method further includes: determining, by the one or more processors, an indication of the completion of the manipulation of the object; and selecting, by the one or more processors, the thermal image for generating the grasp affordance based on determining the thermal image was captured following the indication of the completion of the manipulation of the object.

In some implementations, the method further includes generating grasping parameters for the object based on the grasp affordance and positioning a grasping end effector of the robot based on the grasping parameters.

In some implementations, the method further includes capturing, by the thermographic camera, at least one additional thermal image of the object. The additional thermal image of the object is captured either before the manipulation of the object by the human or after expiration of the threshold amount of time following the completion of the manipulation of the object by the human. In some of those implementations generating the grasp affordance for the object based on the one or more temperatures indicated by the thermal image includes: determining differences between the one or more temperatures indicated by the thermal image and one or more temperatures indicated by the additional thermal image; and defining the one or more portions of the object for the grasp affordance based on the differences in the temperatures for the one or more portions satisfying a threshold.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
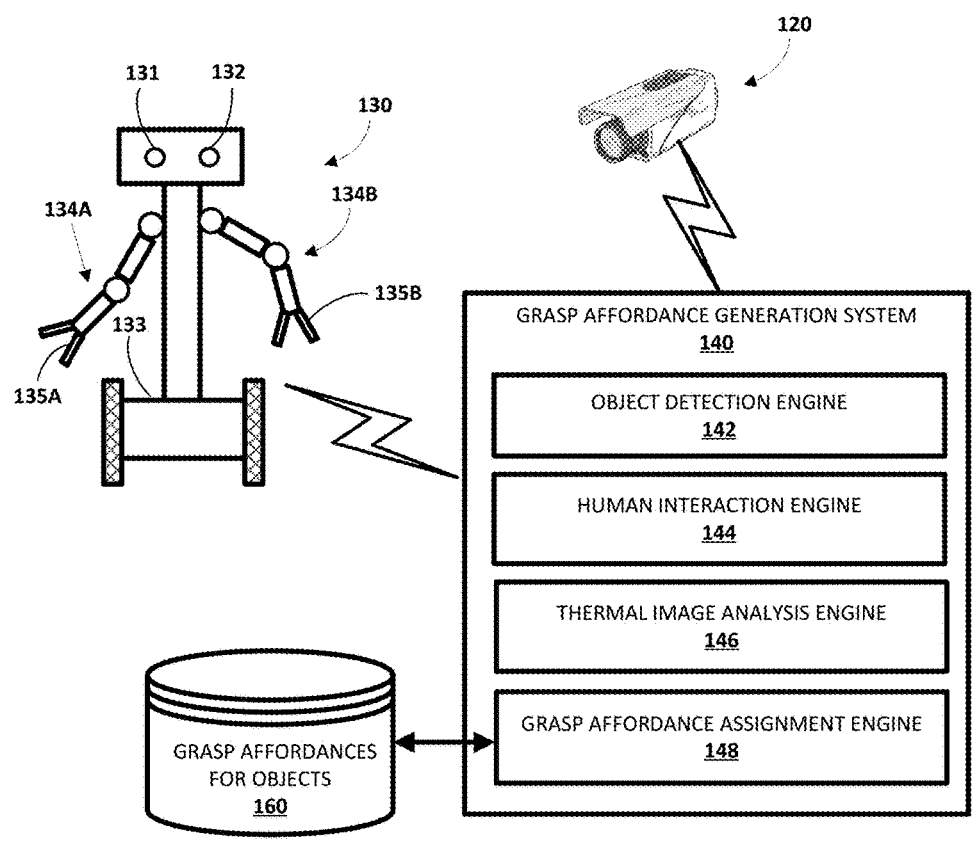
FIG. 1 illustrates an example environment in which a thermographic camera may capture at least one thermal image of an object following human manipulation of the object, and a grasp affordance may be generated for the object based on the temperatures indicated by the captured thermal image.

FIG. 1 illustrates an example environment in which a thermographic camera may capture at least one thermal image of an object following human manipulation of the object, and a grasp affordance may be generated for the object based on the temperatures indicated by the captured thermal image.

A robot 130 is illustrated in the example environment of FIG. 1. A non-robotic thermographic camera 120, a grasp affordance generation system 140, and a grasp affordances for objects database 160 are also illustrated in the environment of FIG. 1. One or more (e.g., all) aspects of the grasp affordance generation system 140 may be implemented in hardware of the robot 130 in some implementations. In some implementations, one or more (e.g., all) aspects of the grasp affordance generation system 140 may be implemented in hardware separate from the robot 130. In some of those implementations, the robot 130 and/or the thermographic camera 120 may provide data to, and/or receive data from, the grasp affordance generation system 140 via one or more networks such as a local area network (LAN) and/or or wide area network (WAN) such as the Internet. In other implementations a direct connection between one or more components may be utilized.

In some implementations, additional and/or alternative robots may be provided in the environment, such as additional robots that vary in one or more respects from robot 130 illustrated in FIG. 1 (e.g., a robot that doesn't include an end effector). In some of those implementations, each of one or more of the robots may provide captured thermal images of objects and/or other data to aspects of grasp affordance generation system 140, or may embody a separate instance of all or aspects of grasp affordance generation system 140, to enable grasp affordances to be determined for various objects based on captured thermal images of the robots. Moreover, in some of those implementations, each of one or more of the robots may have access to, or may embody, one or more grasp affordances for objects of database 160 and/or a convolutional neural network or other system trained based on one or more grasp affordances for objects of database 160, to enable the robots to generate grasping parameters for various objects based on one or more of the grasp affordances.

Also, some implementations may employ data from one or more non-robotic sensors (e.g., non-robotic thermographic camera 120) in generating a grasp affordance for an object based on temperatures indicated by a captured thermal image of the object. In some of those implementations, no robotic sensor may be utilized. For example, in some implementations grasp affordance generation system 140 may be separate from robot 130 and any other robot and may utilize thermal images captured by non-robotic thermographic camera 120, and optionally data from one or more additional non-robotic sensors (e.g., non-robotic non-thermographic vision devices), in generating a grasp affordance for an object. As used herein, when "non-robotic" is used as a modifier for a thermographic camera and/or other sensor, it means that the sensor is not mechanically coupled to any robot and/or is not in network communication with any robot.

Non-robotic thermographic camera 120 captures thermal images utilizing infrared thermography and may be at a fixed position and/or orientation in some implementations. For example, non-robotic thermographic camera 120 may be one of a plurality of non-robotic thermographic cameras installed in fixed positions throughout a warehouse or other environment. Also, for example, non-robotic thermographic camera 120 may be positioned adjacent to a 3D scanning turntable and may capture one or more thermal images of an object after a human has placed the object on the 3D scanning turntable. In some of those implementations, the captured thermal images may be utilized to generate a grasp affordance for the object and that generated grasp affordance may be, for example, assigned to a 3D model of the object generated based on data generated by a separate 3D vision device as the object is rotated on the turntable.

The robot 130 includes robot arms 134A and 134B with corresponding end effectors 135A and 135B, that each take the form of a gripper with two opposing "fingers" or "digits." The robot arms 134A, 134B and end effectors 135A, 135B may be controlled autonomously, semi-autonomously, and/or based on control commands provided by a user via a computing device of the user. For example, the robot arm 134B may be autonomously controlled to position the end effector 135B proximal to an object and the end effector 135B1 may be autonomously controlled to grasp the object. Such autonomous control may be dictated by grasping parameters determined based on generated grasp affordances as described herein. The robot 130 also includes a base 133 with wheels provided on opposed sides thereof for locomotion of the robot 130. The base 133 may include, for example, one or more motors for driving corresponding wheels to achieve a desired direction, velocity, and/or acceleration of movement for the robot 130.

The robot 130 also includes various sensors such as a thermographic camera 131 and a non-thermographic vision device 132. The thermographic camera 131 captures thermal images utilizing infrared thermography. The robot 130 may capture thermal images of objects under various circumstances. For example, the robot 130 may capture a thermal image when it is already engaged in another task (e.g., as it is navigating to a location to perform a task) and/or when it is not engaged in another non-monitoring/observation task (e.g., instead of sitting idle, robot 130 may move throughout the environment to capture thermal images of objects).

A thermal image captured by the thermographic camera 131 indicates one or more temperatures present in the field of view of the thermographic camera 131 at the time of capture of the thermal image. For example, the amount of infrared radiation emitted by a particular portion of an object is a function of the temperature of that particular portion, and the portion of the thermal image that captures that particular portion will indicate the temperature of the particular portion. In some implementations, the temperature of the particular portion may be indicated in the thermal image directly (e.g., if the thermal image is one that defines temperatures converted from corresponding detected infrared wavelengths), In some implementations, the temperature of the particular portion may be indicated in the thermal image inferentially. For example, the temperature may be indicated as a function of an infrared wavelength (e.g., if the thermal image is one that defines detected infrared wavelengths) and/or a visible wavelength (e.g., if the thermal image is one that defines visible wavelengths converted from corresponding detected infrared wavelengths) defined for that particular portion in the thermal image.

The non-thermographic vision device 132 may be, for example, a non-thermographic camera, a 3D laser scanner, a stereo camera, and/or other vision device. As one example, the non-thermographic vision device 132 may be a 3D laser scanner that includes one or more lasers that emit light and one or more sensors that collect data related to reflections of the emitted light. As another example, the non-thermographic vision device 132 may be a stereo camera 131B that includes two sensors (e.g., charge-coupled devices (CCDs)), each at a different vantage point. As yet another example, non-thermographic vision device 132 may be a visible wavelength camera such as a machine vision camera. Although specific examples of non-thermographic vision devices are described herein, additional and/or alternative non-thermographic vision device may be utilized—or may be omitted in some implementations.

The robot 130 also includes one or more controllers that, for example: provide control commands to actuators, thermographic camera 131, non-thermographic vision device 132, and/or other operational components thereof; implement one or more aspects of grasp affordance generation system 140; and/or generate and/or act upon grasping parameters determined based on grasp affordances generated by grasp affordance generation system 140. For example, one or more controllers of robot 130 may provide control commands to servo motors that drive the wheels of the robot 130 to navigate the robot 130 to various locations in the environment autonomously, semi-autonomously, and/or based on control commands provided by a user via a computing device of the user. Additional description of some examples of the structure and functionality of the controller and other components of robot 130 is provided herein.

The grasp affordance generation system 140 may include one or computing systems connected by one or more networks (not depicted). An example of such a computing system is depicted schematically in FIG. 7. Various modules or engines may be implemented as part of grasp affordance generation system 140 as software, hardware, or any combination of the two. For example, in FIG. 1 system 140 includes an object detection engine 142, a human interaction engine 144, a thermal image analysis engine 146, and a grasp affordance assignment engine 148.

The grasp affordance generation system 140 utilizes thermal images captured by thermographic camera 131 and/or data from other sensors of robot 130 to generate grasp affordances for various objects. Various aspects of grasp affordance generation system 140 are described below with respect to the implementations where the system 140 utilizes thermal images captured by thermographic camera 131 and/or data from other sensors of robot 130. However, as described herein, in various implementations the system 140 may additionally and/or alternatively utilize thermal images captured by a non-robotic thermographic camera (e.g., non-robotic thermographic camera 120) and/or other sensor data from other non-robotic sensors in generating grasp affordances for various objects.

The object detection engine 142 utilizes one or more thermal images from the thermographic camera 131 and/or data from the non-thermographic vision device 132 to detect an object. For example, where the non-thermographic vision device 132 is a non-thermographic camera, the engine 142 may utilize one or more images from the non-thermographic camera to detect the object using edge detection and/or other image processing techniques. As another example, where the non-thermographic vision device 132 is a 3D vision sensor such as a stereo camera or laser scanner, the engine 142 may detect the object using sensed feature points provided by the 3D vision sensor. As yet another example, the engine 142 may utilize one or more images from the thermographic camera 131 to detect the object using edge detection (e.g., edges that indicate temperature changes) and/or other image processing techniques.

The detection of the object by object detection engine 142 may be utilized by the grasp affordance generation system 140 for various purposes. For example, as described below, the human interaction engine 144 may utilize the detection of the object to monitor for the start of and/or the cessation of human interaction with the object. As another example and as also described below, the thermal image analysis engine 146 may utilize the detection of the object to localize the object in one or more thermal images. As another example and as also described below, the grasp affordance assignment engine 148 may utilize the detection of the object to map a generated grasp affordance to corresponding portions of a non-thermographic image of the object and/or to corresponding portions of a 3D model of the object. As yet another example, the detection of the object may be utilized to enable the robot 130 to adjust its position and/or orientation and/or to adjust the zoom, tilt, and/or pan of the thermographic camera 131 to focus the field of view of the camera 131 on the object and/or to focus the field of view more particularly on the object. As yet one more example, the detection of the object may be utilized to "crop" or otherwise alter one or more images for thermal image analysis engine 146 (e.g., to alter the image so that only the object is present in the image, or to remove at least some "non-object" aspects of the image).

The human interaction engine 144 is optional and may provide cues to the thermal image analysis engine 146 to enable the thermal image analysis engine 146 to select one or more thermal images of an object that are appropriate for determining a grasp affordance for the object and/or that enable the thermal image analysis engine 146 to direct the thermographic camera 131 to capture thermal images of the object that would be appropriate for determining a grasp affordance for the object. For example, the human interaction engine 144 may use data from one or more sources to determine that human manipulation of an object is likely to begin, to determine a starting time that human manipulation of an object likely began, and/or to determine a completion time that human manipulation of the object likely ceased.

The determination that human manipulation of an object is likely to begin and/or the determined starting time may be used by the thermal image analysis engine 146 to determine at least one "non-influenced" thermal image of the object in implementations where the thermal image analysis engine 146 utilizes at least one "non-influenced" thermal image to generate a grasp affordance. For example, the determination that human manipulation of an object is likely to begin may be used by the thermal image analysis engine 146 to direct the thermographic camera 131 to capture a thermal image of the object before the human manipulation begins and/or to select (from a plurality of buffered or otherwise stored thermal images) a thermal image of the object that was captured by the thermographic camera 131 prior to the time that human manipulation of the object was likely to begin. Also, for example, the determined starting time may be used by the thermal image analysis engine 146 to select a thermal image of the object that was captured by the thermographic camera 131 prior to the starting time.

The human interaction engine 144 may utilize various techniques to determine the starting time and/or that human manipulation of the object is likely to begin. For example, in some implementations the engine 144 may make such determination(s) based on determining that one or more thermal images captured by thermographic camera 131 include: temperature indications that are indicative (in size, shape, and/or temperature) of a human; temperature indications that are indicative of a human and are moving across multiple thermal images; temperature indications that are generally indicative of movement; temperature indications that are indicative of movement with a threshold distance of the object (as localized by engine 142); and/or temperature indications that are indicative of a human and that are within a threshold distance of the object. The human interaction engine 144 may utilize various image processing techniques to determine movement and/or indications of a human. For example, the engine 144 may detect movement based on comparing pixels across multiple thermal images to determine at least a threshold number of pixels have changed and/or have changed by at least a threshold amount.

Also, for example, in some implementations the engine 144 may make such determination(s) based on data from a non-thermographic sensor such as non-thermographic vision device 132. For instance, where the device 132 is a non-thermographic camera, the engine 146 may make such determination(s) based on determining that one or more images captured by the non-thermographic camera 131 include: visual indications that are indicative (in size and/or shape) of a human; visual indications that are indicative of a human and are moving across multiple images; visual indications that are generally indicative of movement; visual indications that are indicative of movement with a threshold distance of the object (as localized by engine 142); and/or to visual indications that are indicative of a human and that are within a threshold distance of the object. The human interaction engine 144 may utilize various image processing techniques to determine movement and/or indications of a human. For example, the engine 146 may detect movement based on comparing pixels across multiple images to determine at least a threshold number of pixels have changed and/or have changed by at least a threshold amount.

As yet another example, in some implementations the engine 144 may make such determination(s) based on data from a non-camera based motion sensor, such as a passive infrared (PIR) sensor, a microwave sensor, or an ultrasonic sensor (of the robot 130 or separate from the robot 130). For example, the engine 144 may determine the starting time and/or that human manipulation of the object is likely to begin based on an initial detection of motion as indicated by data from the non-camera based motion sensor.

A completion time determined by the human interaction engine 144 may be used by the thermal image analysis engine 146 to determine at least one manipulation influenced thermal image of the object. For example, the completion time may be used by the thermal image analysis engine 146 to direct the thermographic camera 131 to capture a thermal image of the object following the completion time and/or to select (from a plurality of buffered or otherwise stored thermal images) a thermal image of the object that was captured by the thermographic camera 131 after the completion time.

The human interaction engine 144 may utilize various techniques to determine the completion time. For example, in some implementations the engine 144 may make such determination(s) based on determining that one or more thermal images captured by thermographic camera 131 and/or data from non-thermographic vision device 132: were indicative of a human and/or movement, but are no longer indicative of a human and/or movement; indicate a human moving away from an object; were indicative of movement and/or a human within a threshold distance of an object, but are now indicative of movement and/or a human beyond the threshold distance of the object. The human interaction engine 144 may utilize various image processing techniques to determine movement and/or indications of a human. As another example, in some implementations the engine 144 may determine a completion time based on data from a non-camera based motion sensor, such as a passive infrared (PIR) sensor, a microwave sensor, or an ultrasonic sensor. For example, the engine 144 may determine the completion time based on the time that detection of motion from the non-camera based motion sensor ceased, as indicated by data from the non-camera based motion sensor.

As yet another example, in some implementations the engine 144 may determine a completion time based on determining that the position and/or orientation of the object has changed (optionally in combination with one or more of the separate determinations discussed in the previous paragraph). For instance, the engine 144 may communicate with the object detection engine 142 to detect an object across multiple images (thermal or non-thermal) and may determine a completion time based at least in part on determining that the position and/or orientation of the object has changed across the multiple images.

In some implementations, the completion time determined by the human interaction engine 144 may also be used by the thermal image analysis engine 146 to determine at least one "non-influenced" thermal image of the object. For example, the completion time may be used by the thermal image analysis engine 146 to direct the thermographic camera 131 to capture a thermal image of the object at a time that is at least a threshold amount of time after the completion time and/or to select (from a plurality of buffered or otherwise stored thermal images) a thermal image of the object that was captured by the thermographic camera 131 at a time that is at least a threshold amount of time after the completion time. The threshold amount of time may be an amount of time that allows the heat signature left on the object from the human manipulation to sufficiently "wear off". For example, the threshold amount of time may be at least 10 seconds, 20 seconds, or 30 seconds.

The thermal image analysis engine 146 generates a grasp affordance for an object detected by the object detection engine 142 based on temperatures indicated by at least one thermal image that includes the object and that was captured by thermographic camera 131 within a threshold amount of time following human manipulation of the object (i.e., a manipulation influenced thermal image). In some implementations, the thermal image analysis engine 146 may utilize output from object detection engine 142 to localize the object in thermal image(s) to restrict aspects of its analysis to the portions of the thermal image that correspond to the object. In some implementations, the thermal image analysis engine 146 may utilize output from human interaction engine 144 to select a manipulation influenced thermal image.

In some implementations, the thermal image analysis engine 146 generates a grasp affordance for an object based only on at least one manipulation influenced thermal image. For example, the thermal image analysis engine 146 may generate the grasp affordance to encompass one or more portions of an object that have temperatures above "X" indicated in one or more thermal images, that have temperatures between "X" and "Y" indicated in the thermal image(s), and/or that have temperatures indicated that are at least "X" degrees greater than temperatures indicated in other portions in the one or more thermal images. The thermal image analysis engine 146 may utilize additional and/or alternative criteria to generate a grasp affordance, such as that a portion that has temperature indications that meet one or more "temperature indication" criteria must also be of at least a certain size (e.g., to ignore small errant areas) and/or less than a certain size (e.g., to ignore very large areas that may be the result of the user sitting on the object or other "non-hand" manipulation of the object).

A temperature indication in a thermal image may be a direct indication of the temperature (e.g., if the thermal image is one that defines temperatures converted from corresponding detected infrared wavelengths) or an inferential indication of the temperature such as an infrared wavelength (e.g., if the thermal image is one that defines detected infrared wavelengths) and/or a visible wavelength (e.g., if the thermal image is one that defines visible wavelengths converted from corresponding detected infrared wavelengths). Thus, as used herein, determining that a temperature indication in a thermal image meets a criterion may include, for example, determining that a wavelength (infrared or visible) in the thermal image meets a corresponding criterion. For instance, determining that temperatures indicated for a portion of an image are between 80 and 100 degrees Fahrenheit may comprise determining that wavelengths defined for that portion of the image are between "X" and "y" nanometers.

In some implementations, the thermal image analysis engine 146 generates a grasp affordance for an object based on at least one manipulation influenced thermal image of the object and based on at least one non-influenced thermal image of the object. In some implementations, the thermal image analysis engine 146 may utilize output from human interaction engine 144 to select a manipulation influenced thermal image of the object and/or non-influenced thermal image of the object.

As one example, the thermal image analysis engine 146 may generate the grasp affordance to encompass one or more portions of an object that indicate temperatures that vary by at least X degrees between one or more pre-manipulation images and one or more post-manipulation images. For instance, where the thermal images define wavelengths, the images may optionally be aligned and wavelengths from a manipulation influenced thermal image may be subtracted by corresponding wavelengths of a non-influenced thermal image. The grasp affordance may be generated based on any pixels of the object that have a positive wavelength greater than a threshold wavelength. For instance, the grasp affordance may encompass a portion of the object that corresponds to those pixels that have a positive wavelength greater than the threshold wavelength. The thermal image analysis engine 146 may utilize additional and/or alternative criteria to generate a grasp affordance, such as that a portion that has temperature indications that meet one or more "temperature indication" criteria must also be of at least a certain size (e.g., to ignore small errant areas) and/or less than a certain size (e.g., to ignore very large areas).

In some implementations, the thermal image analysis engine 146 may generate a grasp affordance that conforms exactly to one or more portions of an object that meet one or more criteria. In some implementations, the thermal image analysis engine 146 may generate a grasp affordance that is a rectangle, a circle, a box, a sphere and/or other shape that encompasses all or at least some of such portions. For example, the thermal image analysis engine 146 may generate a grasp affordance that is a shape that encompasses a cluster of one or more portions of the object that meet temperature indication and size criteria.

Grasp affordance assignment engine 148 assigns a generated grasp affordance to corresponding portions of a representation of the object and stores the grasp affordance, the assignment, and optionally the representation in grasp affordances for objects database 160. The database 160 may be provided in memory and/or a hard drive that is provided on the robot 130 and/or may be provided in one or more non-transitory storage mediums that are external to the robot 130.

The grasp affordance assignment engine 148 may assign a generated grasp affordance for an object to a representation of the object in various manners. For example, the grasp affordance assignment engine 148 may assign the grasp affordance to corresponding portions of a thermal image of the object, such as one of the thermal image(s) utilized to generate the grasp affordance. Also, for example, the grasp affordance assignment engine 148 may assign the grasp affordance to corresponding portions of a 3D model (a full or partial 3D model) of the object generated from other sensors, such as non-thermographic vision device 132. For instance, the portions of a thermographic image of an object to which the grasp affordance conforms may be mapped to corresponding portions of a 3D model of the object.

Also, for example, the grasp affordance assignment engine 148 may assign the grasp affordance to corresponding portions of a non-thermographic image. For instance, the non-thermographic image and the thermographic image may have similar camera angles and zooms, and the generated grasp affordance may be assigned to corresponding portions of the non-thermographic image. In some implementations, the grasp affordance assignment engine 148 may utilize output from object detection engine 142 to localize the object in thermal image(s) utilized to generate the grasp affordances and localize the object in a non-thermographic image of the object. In some of those implementations, the grasp affordance assignment engine 148 may map the portions of the objet that correspond to the grasp affordance in the thermal image to corresponding portions of the object in the non-thermal image to assign the grasp affordance to the non-thermal image.

In some implementations, the grasp affordance assignment engine 148 may further assign the grasp affordance to an identifier of the object, such as an identifier determined based on a fiducial tag of the object, a radio-frequency identification (RFID) tag (passive or active) of the object, and/or feature points of the object. Accordingly, the grasp affordance assignment engine 148 may map a generated grasp affordance for an object to an image, a 3D model, or other graphical representation of the object, and may optionally be mapped to an identifier of the object, such as a "class" of the object or a more particular identifier of the object (e.g., a unique identifier extracted from an RFID tag or fiducial marker). The grasp affordance and mapped data may be stored by the engine 148 in grasp affordances for objects database 160.

One or more generated grasp affordances may be utilized for various purposes. For example a grasp affordance may be utilized "live" by the robot 130. For instance, a manipulation influenced thermal image may be captured by thermographic camera 131 of the robot 130, a grasp affordance generated based on the manipulation influenced thermal image, and the generated grasp affordance used by the robot 130 to generate one or more grasping parameters for grasping of that particular object by end effector 135A and/or end effector 135B. In some of those implementations, the grasp affordance may be utilized as one of the grasping parameters (e.g., at least one of the portions defined by the grasp affordance may be a "reference point" for positioning the end effector), or the grasp affordance may be utilized as a cue for determining grasping parameters (e.g., an "initial search space" for a "brute force" approach may be based on the grasp affordance).

As another example of a use for generated grasp affordances, multiple grasp affordances generated based on thermal images from robot 130, thermographic camera 120, and/or other agents can be used to populate a plurality of grasp affordances for objects in database 160. In some of those implementations, grasp affordances of the populated database 160 can be utilized directly by robot 130 and/or other robots to identify one or more grasp affordances for each of a plurality of objects. In some of those implementations, the grasp affordance may be utilized as one of the grasping parameters, or the grasp affordance may be utilized as a cue for determining grasping parameters. Also, in some of those implementations, a grasp affordance may be selected from the database 160 based on an image, 3D model, and/or object identifier assigned to the grasp affordance in the database 160. For example, a robot may capture an image of a target object, that image may be utilized to identify one or more matching images in the database 160, and the grasping affordance(s) assigned to the matching image(s) selected for use by the robot in determining grasping parameters for the target object. As another example, a robot may identify an object identifier of a target object, that object identifier may be utilized to identify one or more matching object identifiers in the database 160, and the grasping affordance(s) assigned to the matching object identifier(s) selected for use by the robot in determining grasping parameters for the target object.

Additionally and/or alternatively, grasp affordances of the populated database 160 can be utilized to generate training examples for training a machine learning system (e.g., a convolutional neural network) to detect one or more grasps for objects. For example, the grasp affordances may be utilized as outputs of training examples, and one or more aspects of the corresponding representation of the object (e.g., 3D model, image) to which it is assigned utilized as inputs of the training examples. In some of those implementations, the trained machine learning system may be trained to identify a "grasp area" that narrows the search space for a "brute force" technique and/or other technique.

As yet another example of a use for one or more generated grasp affordances, a grasp affordance for an object may be combined with a learned "pre-grasp" trajectory to generate an estimated end-to-end policy for grasping an object that includes approach, pre-grasp, and closure information for the object. For example, in some implementations, grasp affordance generation system 140 and/or a separate system may include a vision-based hand tracking system. The vision-based hand tracking system may utilize data from one or more vision devices (e.g., thermographic camera 131 and/or non-thermographic vision device 132) to determine a trajectory (positions and optionally orientations) of human's hand before the human manipulates an object. In some of those implementations, such a vision-based hand tracking system may determine a confident trajectory for the human's hand if the vision device has an un-occluded view of the whole hand. However, when the human manipulates an object, the vision device may have at least a partially occluded view of the whole hand, which may make the vision-based hand tracking system's tracking for that time frame impossible and/or of low confidence.

Accordingly, in some implementations the vision-based hand tracking system may determine a confident pre-manipulation trajectory of the hand—but may not be able to determine confident trajectory information at and/or near the time of manipulation. In some of those implementations, a grasp affordance generated according to techniques described herein may be utilized as an additional data point and combined with the pre-manipulation trajectory to yield an estimated end-to-end policy for grasping that includes approach, pre-grasp, and closure information. For example, grasp affordance generation system 140 (and/or another system) can probabilistically fuse the trajectory of the hand prior to occlusion (determined by the vision-based hand tracking system) with the grasp affordance to yield a trajectory for the entire process. The hand trajectory for the entire process may be utilized, for example, by a robot to direct an end effector thereof along the hand trajectory for grasping of the object and/or for grasping of similar objects.

Figure 2A:
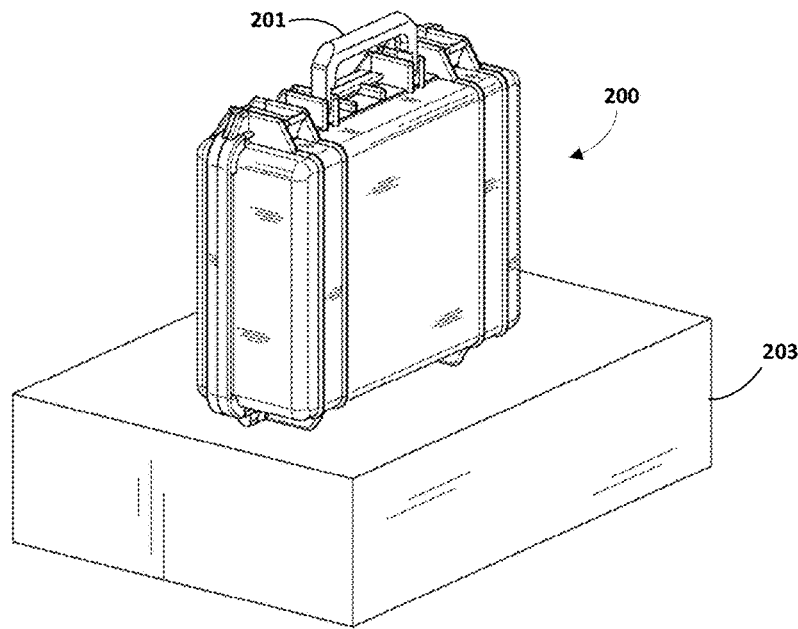
FIG. 2A illustrates an example suitcase.
Figure 2B:
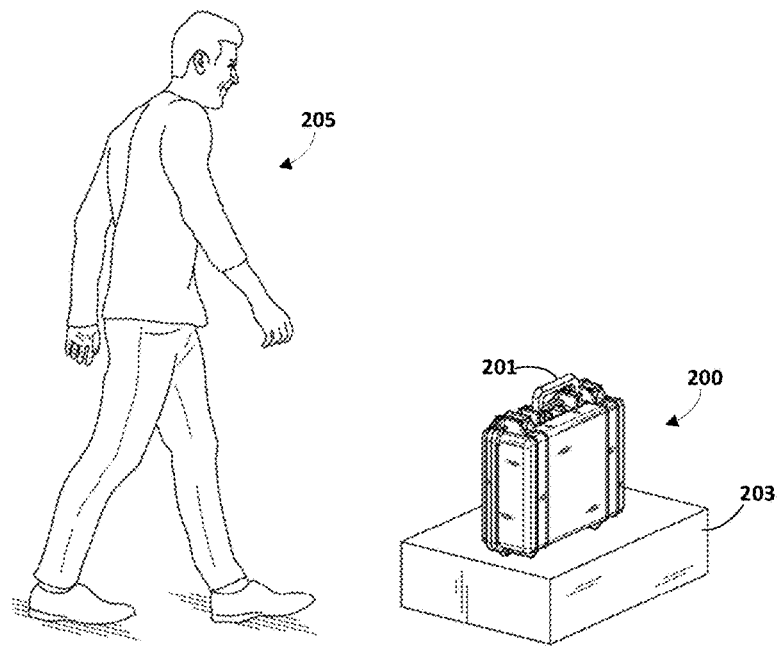
FIG. 2B illustrates an example of a human approaching the suitcase.

Referring now to FIGS. 2A-4C, further description of grasp affordance generation system 140 is provided with respect to one example scenario. FIG. 2A illustrates an example of a suitcase 200 with a handle 201 that is positioned on platform 203. FIG. 2B illustrates an example of a human 205 approaching the suitcase 200. FIG. 2C illustrates an example of the human 205 grasping the handle 201 of the suitcase 200 during manipulation of the suitcase 200 by the human 205. For example, the human 205 may have picked up the suitcase 200 from the platform 203 and the placed it back on the platform 203. FIG. 2D illustrates an example of the human 205 retreating from the suitcase 200 after the human 205 has placed it back on the platform 203.

Figure 2C:
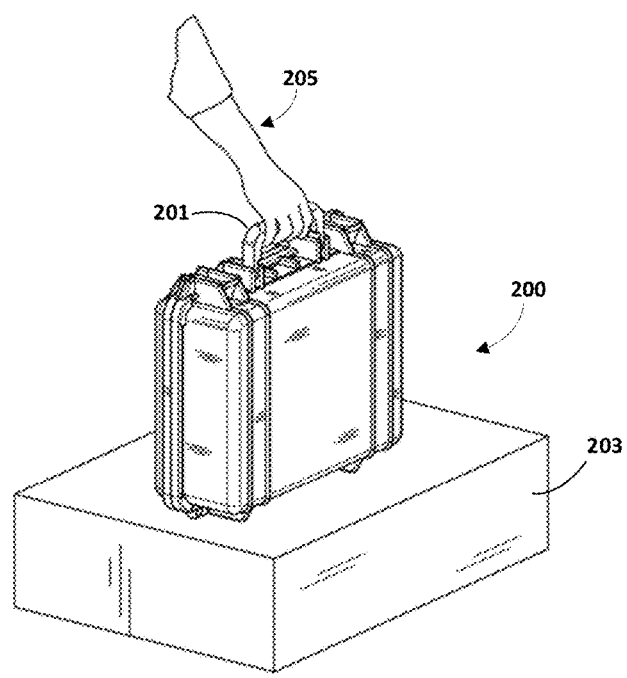
FIG. 2C illustrates an example of the human grasping a handle of the suitcase during manipulation of the suitcase by the human.
Figure 2D:
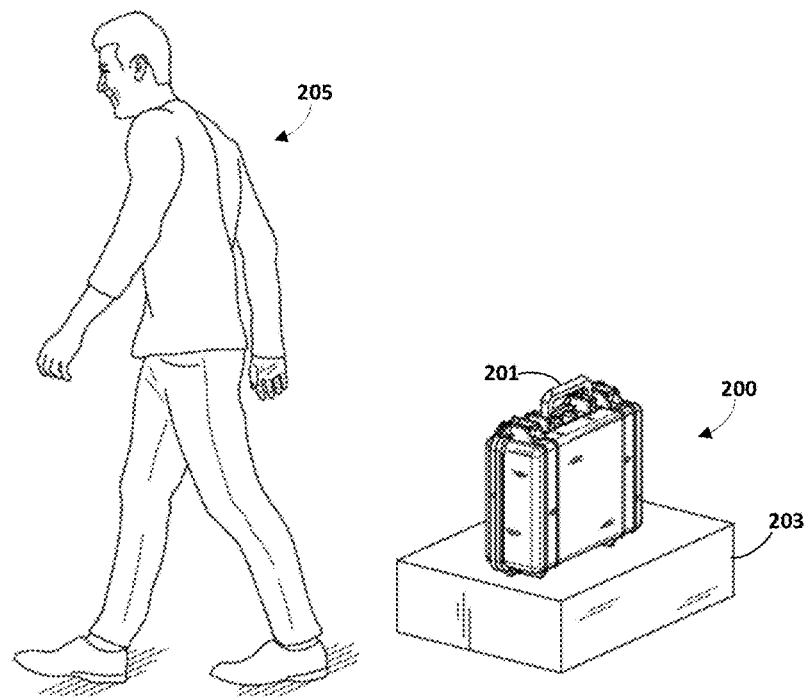
FIG. 2D illustrates an example of the human retreating from the suitcase following the manipulation of the suitcase.
Figure 3A:
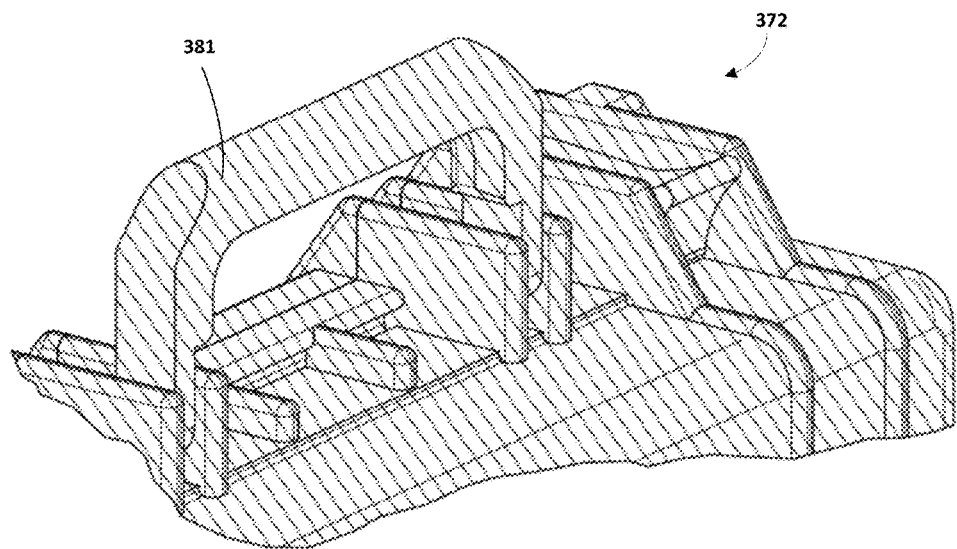
FIG. 3A illustrates a representation of part of a thermal image of the suitcase of FIGS. 2A-2D captured when the heat signature of the suitcase is not influenced by the human manipulation of the object that is illustrated in part in FIG. 2C.

FIG. 3A illustrates a representation 372 of part of a non-influenced thermal image of the suitcase 200 of FIGS. 2A-2D captured when the heat signature of the suitcase is not influenced by the human manipulation of the object that is illustrated in part in FIG. 2C. For example, the non-influenced thermal image may have been captured prior to the manipulation of the suitcase 200 by the human 205. Only part of the non-influenced thermal image is illustrated in the representation 372 depicted in FIG. 3A for the sake of simplicity. The representation 372 is illustrated in FIG. 3A with first shading 381 to indicate the temperature indications of the non-influenced thermal image. The first shading 381 is consistent throughout, indicating substantially consistent temperature indications in the non-influenced thermal image across the part of the suitcase 200 visible in FIG. 3A. For clarity, the representation 372 of FIG. 3A is also illustrated with visible portions of the suitcase 200 in addition to the first shading 381. However, it is understood that thermal images may represent only temperature indications of an object and may not represent human visible portions of the object.

Figure 3B:
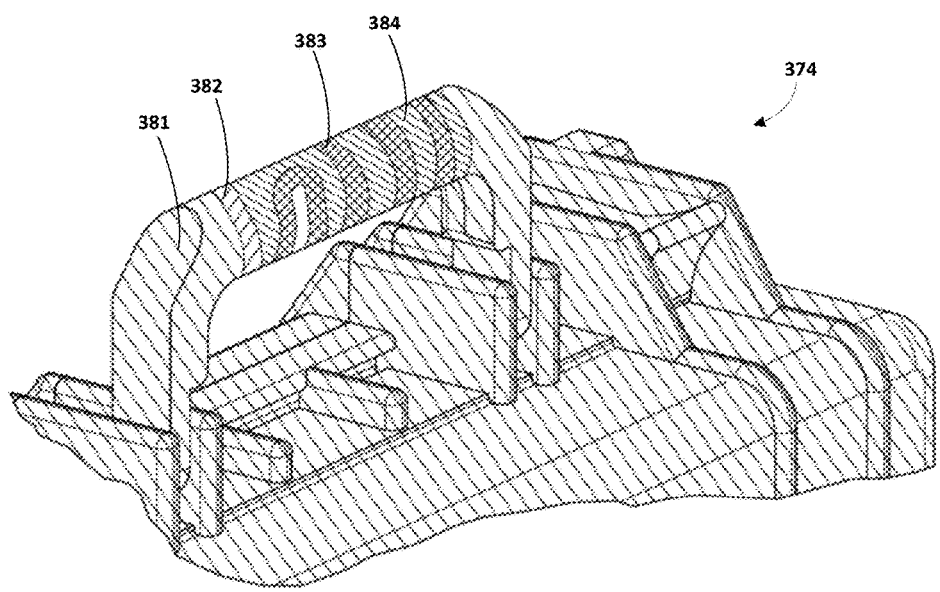
FIG. 3B illustrates a representation of part of another thermal image of the suitcase of FIGS. 2A-2D captured when the heat signature of the suitcase is influenced by the human manipulation of the object that is illustrated in part in FIG. 2C.

FIG. 3B illustrates a representation 374 of part of a manipulation influenced thermal image of the suitcase 200 of FIGS. 2A-2D captured when the heat signature of the suitcase is influenced by the human manipulation of the object that is illustrated in part in FIG. 2C. For example, the non-influenced thermal image may have been captured shortly after cessation of the manipulation of the suitcase 200 by the human 205. Only part of the non-influenced thermal image is illustrated in the representation 374 depicted in FIG. 3B for the sake of simplicity. The representation 374 is illustrated in FIG. 3B with the first shading 381 over portions of the suitcase 200, second shading 382 over other portions of the suitcase 200, third shading 383 over yet other portions of the suitcase 200, and fourth shading 384 over yet other portions of the suitcase 200. The various shadings 381-384 each indicate a different temperature indication of the manipulation influenced thermal image. For example, shading 384 may indicate the highest temperature indication, shading 383 the next highest, shading 382 the next highest, and shading 381 the lowest. For clarity, the representation 374 of FIG. 3B is also illustrated with visible portions of the suitcase 200. However, it is understood that thermal images may represent only temperature indications of an object and may not represent human visible portions of the object.

The thermal image analysis engine 146 generates a grasp affordance for the suitcase 200 based on at least the manipulation influenced thermal image represented in FIG. 3B. For example, the thermal image analysis engine 146 may generate the grasp affordance to encompass one or more of the portions of the suitcase 200 represented by the shading 382, 383, and/or 384 of FIG. 3B. For instance, the thermal image analysis engine 146 may generate the grasp affordance to encompass those portions of the suitcase 200 represented by the shading 383 and 384 of FIG. 3B based on the temperature indication of those portions being indicative of a temperature of at least "X" degrees and/or being at least "Y" degrees greater than other portions such as portions represented by the shading 381 of FIG. 3B. The portion represented by shading 382 may not be encompassed by the grasp affordance based on, for example, its temperature indication failing to be at least "X" degrees.

As another example, the thermal image analysis engine 146 may generate the grasp affordance to encompass those portions of the suitcase 200 represented by the shading 383 and 384 of FIG. 3B based on determining the temperature indications of those portions in FIG. 3B vary by at least a threshold amount relative to the temperature indication of those portions in FIG. 3A. For example, the grasp affordance may be generated based on determining the temperature indication represented by each of shading 383 and shading 384 of FIG. 3B is indicative of a temperature that is at least "X" degrees higher than that indicated by shading 381 (the indication of the temperature of those portions in FIG. 3A).

As described herein, in some implementations, the thermal image analysis engine 146 may utilize output from human interaction engine 144 to select a manipulation influenced thermal image of the object and/or non-influenced thermal image of the object. For instance, the human interaction engine 144 may have provided an indication that human manipulation of an object is likely to begin based on sensing motion close to the suitcase 200 when the human 205 was in the position of FIG. 2B, and the non-influenced thermal image of the object selected by the thermal image analysis engine 146 based on a time that corresponds to that indication. Also, for instance, the human interaction engine 144 may have provided a completion time based on no longer sensing motion close to the suitcase 200 (e.g., when the human 205 was in the position of FIG. 2D), and the manipulation influenced thermal image of the object selected by the thermal image analysis engine 146 based on the completion time (e.g., a thermal image time stamped with the completion time or timestamped within a threshold amount of time of the completion time).

Figure 4A:
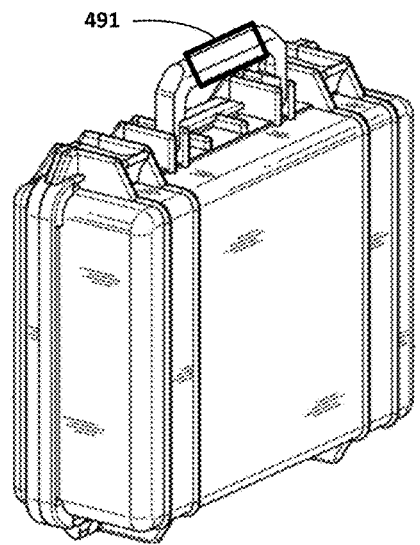
FIGS. 4A and 4B illustrate representations of example grasp affordances that may be generated for the suitcase of FIGS. 2A-4C based on the thermal image represented in FIG. 3B.
Figure 4B:
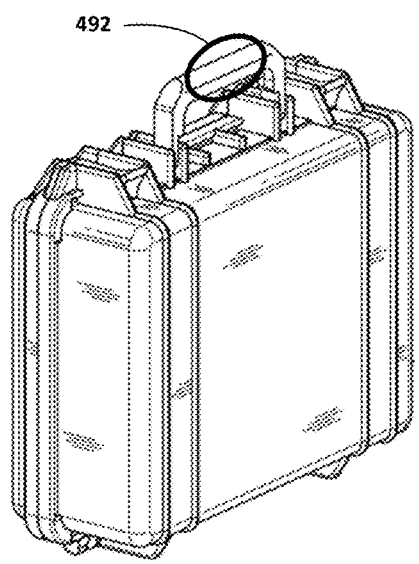

FIGS. 4A and 4B illustrate representations of example grasp affordances that may be generated for the suitcase of FIGS. 2A-4C based on the thermal image represented in FIG. 3B. In FIG. 4A, grasp affordance representation 491 is a rectangle that encompasses the portions of the suitcase 200 represented by the shading 383, and 384 of FIG. 3B. In FIG. 4B, grasp affordance representation 491 is an ellipse that encompasses the portions of the suitcase 200 represented by the shading 383 and 384 of FIG. 3B. Additional and/or alternative grasp affordances may be provided such as grasp affordances that each generally define one or more two and/or three dimensional shapes. The grasp affordance representations 491 and 492 of FIGS. 4A and 4B are provided for ease in explanation. A grasp affordance need not be provided as an actual graphical representation. For example, in some implementations of techniques described herein the grasp affordances may be defined as a plurality of discrete coordinates of a representation of the object, as a formula that defines one or more areas and that is mapped to a representation of the object, etc.

Although some examples are described herein with respect to a single manipulation influenced thermal image and/or a single non-influenced thermal image, some implementations may utilize multiple manipulation influenced thermal images and/or multiple non-influenced thermal images in generating a given grasp affordance. For example, thermal image analysis engine 146 may use multiple manipulation influenced thermal images to generate an "average" manipulation influenced thermal image that averages or otherwise combines the temperature indications of the multiple manipulation influenced thermal images. The thermal image analysis engine 146 may then determine grasping parameters based on the average manipulation influenced thermal image. Thermal image analysis engine 146 may likewise utilize multiple non-influenced thermal images.

Figure 5:
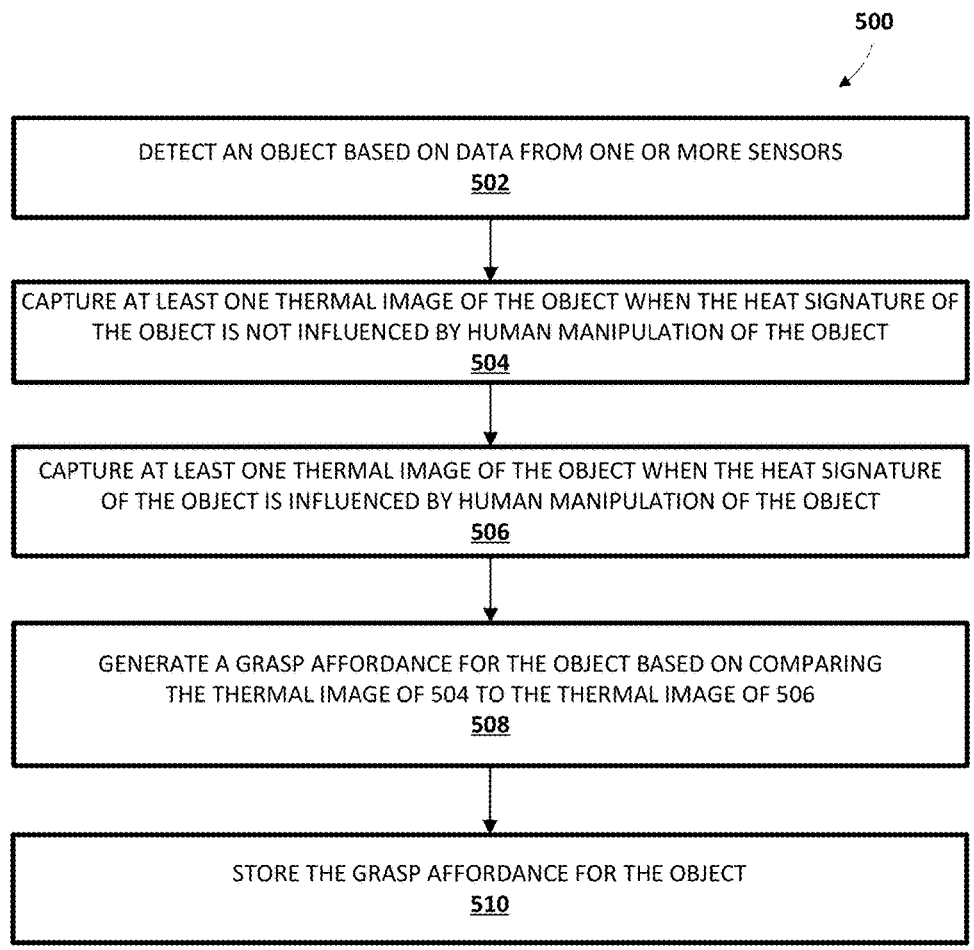
FIG. 5 depicts a flow chart illustrating an example method of utilizing a thermographic camera to capture at least one thermal image of an object following human manipulation of the object, and generating a grasp affordance for the object based on temperatures indicated by the captured thermal image.

FIG. 5 depicts a flow chart illustrating an example method 500 of utilizing a thermographic camera to capture at least one thermal image of an object following human manipulation of the object, and generating a grasp affordance for the object based on the temperatures indicated by the captured thermal image. For convenience, the operations of the flow chart are described with reference to a system that performs the operations. This system may include various components of various computer systems, such as grasp affordance generation system 140 of FIG. 1 and/or controller 602 of FIG. 6. Moreover, while operations of method 500 are shown in a particular order, this is not meant to be limiting. One or more operations may be reordered, omitted or added.

At block 502, the system detects an object based on data from one or more sensors. For example, the system may utilize one or more thermal images from a thermographic camera and/or data from a non-thermographic vision device to detect the object. For instance, the system may utilize edge detection, feature points, and/or other techniques to detect the object. In some implementations, block 502 may be omitted.

At block 504, the system captures at least one thermal image of the object when the heat signature of the object is not influenced by human manipulation of the object. For example, the system may capture the at least one thermal image of the object before manipulation of the object and/or after expiration of at least a threshold amount of time following completion of manipulation of the object (e.g., when the heat signature left by the manipulation has worn off).

At block 506, the system captures at least one thermal image of the object when the heat signature of the object is influenced by human manipulation of the object. For example, the system may capture the at least one thermal image of the object prior to expiration of at least a threshold amount of time following completion of manipulation of the object (e.g., when the heat signature left by the manipulation is still present).

At block 508, the system generates a grasp affordance for the object based on comparing the at least one image of block 504 to the at least one image of block 504. For example, the system may generate the grasp affordance to encompass one or more portions of an object that indicate temperatures that vary by at least X degrees between the at least one thermal image of block 504 and the at least one thermal image of block 504. For instance, where the thermal images define wavelengths, the system may optionally align the images and wavelengths from the image of block 506 may be subtracted by corresponding wavelengths of the thermal image of block 504. The system may generate the grasp affordance based on any pixels of the object that have a positive wavelength greater than a threshold wavelength. For instance, the grasp affordance may encompass a portion of the object that corresponds to those pixels that have a positive wavelength greater than the threshold wavelength. The system may utilize additional and/or alternative criteria to generate a grasp affordance, such as that a portion that has temperature indications that meet one or more "temperature indication" criteria must also be of at least a certain size (e.g., to ignore small errant areas) and/or less than a certain size (e.g., to ignore very large areas).

At block 510, the system stores the grasp affordance for the object. In some implementations, the system assigns the generated grasp affordance to corresponding portions of a representation of the object and stores the grasp affordance, the assignment, and optionally the representation. The representation of the object may be, for example, a thermal image of the object, a 3D model of the object, and/or a non-thermal image of the object.

Method 500 describes generating a grasp affordance for an object based on at least one manipulation influenced thermal image of the object and based on at least one non-influenced thermal image of the object. However, as described herein, in some implementations a grasp affordance may be generated for an object based on at least one manipulation influenced thermal image of the object and with any non-influenced thermal images of the object.

Figure 6:
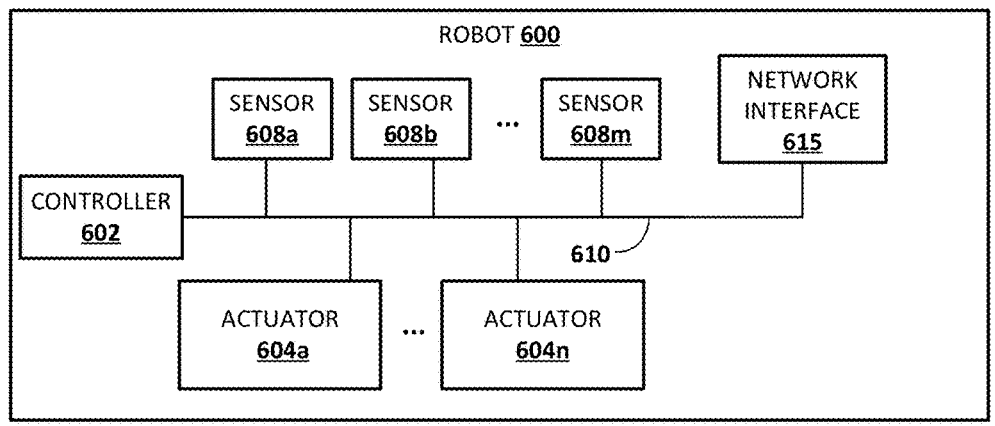
FIG. 6 schematically depicts an example architecture of a robot.

FIG. 6 schematically depicts an example architecture of a robot. Robot 600 may take various forms, including but not limited to a form similar to robot 330, a telepresence robot, a humanoid form, an animal form, a wheeled device, a submersible vehicle, an unmanned aerial vehicle ("UAV"), and so forth. In various implementations, robot 600 may include a controller 602. Controller 602 may take various forms, such as one or more processors, one or more field-programmable gate arrays ("FPGA"), one or more application-specific integrated circuits ("ASIC"), one or more so-called "real time controllers," and so forth.

In various implementations, controller 602 may be operably coupled with one or more actuators 604a-n and/or one or more sensors 608a-m, e.g., via one or more buses 610. Sensors 608a-m may take various forms, including but not limited to thermographic cameras, non-thermographic vision devices, depth sensors, light sensors, pressure sensors, pressure wave sensors (e.g., microphones), motion sensors, proximity sensors, accelerometers, gyroscopes, thermometers, barometers, and so forth. While sensors 608a-m are depicted as being integral with robot 600, this is not meant to be limiting. In some implementations, one or more sensors 608a-m may be located external to robot 600, e.g., as standalone units.

Controller 602 may provide control commands to the actuators 604a-n and/or the sensors 608a-m to accomplish one or more tasks such as grasping objects, capturing thermal images of objects, capturing non-thermal images of object, etc. Actuators 604a-n may include, for example, one or more end effectors and/or one or more servo motors or other actuators to effectuate movement of one or more components of the robot. For example, the robot 600 may have multiple degrees of freedom and each of the actuators may control actuation of the robot 600 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The controller 602 may provide real time bursts of data to the actuators 604 a-n, with each of the real time bursts comprising a set of one or more control commands that dictate, inter alia, the parameters of motion (if any) for each of one or more of the actuators 604a-n. In some implementations, control commands may be generated by controller 602 to position an end effector of the robot 600 to grasp an object. The control commands may be based on grasping parameters generated based directly or indirectly on grasp affordances for objects generated according to techniques described herein. For instance, a manipulation influenced thermal image may be captured by a thermographic sensor of sensors 608a-m of the robot 600, a grasp affordance generated based on the manipulation influenced thermal image, and the generated grasp affordance used by controller 602 to generate one or more grasping parameters for grasping of the object. In some of those implementations, the controller 602 may use the grasp affordance as one of the grasping parameters (e.g., at least one of the portions defined by the grasp affordance may be a "reference point" for positioning the end effector), or may use the grasp affordance to define an "initial search space" for a "brute force" and/or other approach for determining grasping parameters.

Controller 602 may further execute instructions to implement one or more (e.g., all) aspects of grasp affordance generation system 140 and/or may establish a network connection with system 140 via network interface subsystem 615 (when system 140 is separate from robot 600) and provide various data to and/or receive various data from system 140 as described herein. Network interface subsystem 615 provides an interface to outside networks and is coupled to one or more corresponding interface devices in one or more other computer systems such as system 140. In some implementations, robot 600 may incorporate, in addition to other components, one or more aspects of a computer system, such as computer system 710 described below.

Figure 7:
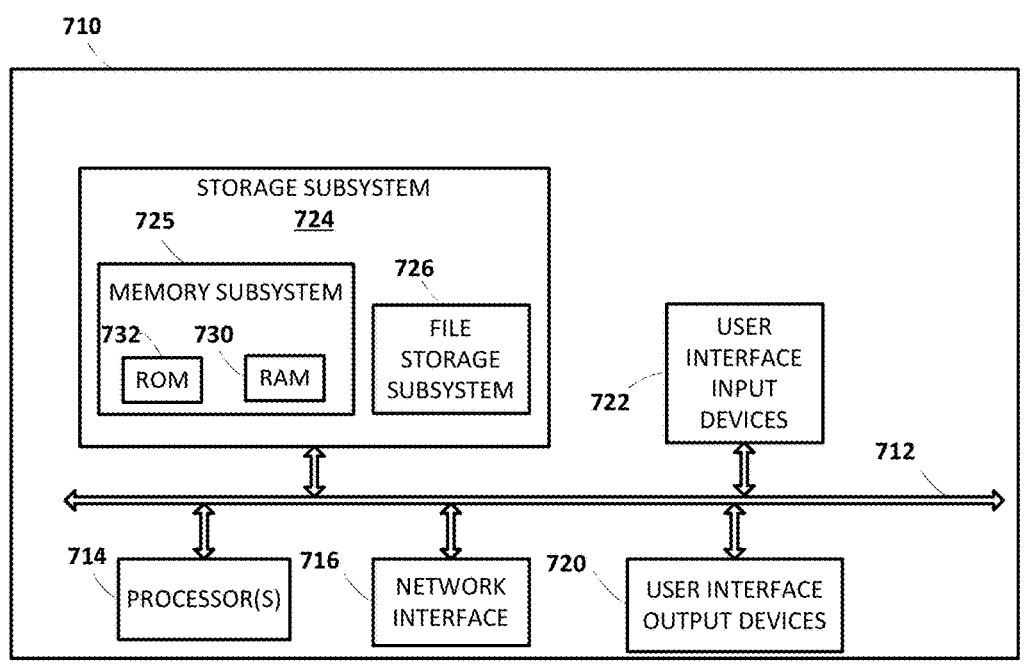
FIG. 7 schematically depicts an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 500 and/or to implement one or more aspects of controller 602, engine 142, engine 144, engine 146, and/or engine 148. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a CD-ROM drive, an optical drive, or removable media cartridges. Modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
    detecting an object based on data from one or more sensors of a robot;
    capturing, by a thermographic camera of the sensors of the robot, at least one thermal image of the object prior to expiration of a threshold amount of time following completion of manipulation of the object by a human;
    capturing, by the thermographic camera, at least one additional thermal image of the object, the additional thermal image of the object captured either before the manipulation of the object by the human or after expiration of the threshold amount of time following the completion of the manipulation of the object by the human;
    generating, by one or more processors, a grasp affordance for the object based on differences in temperatures indicated by the thermal image and the additional thermal image, the grasp affordance defining one or more portions of the object touched by the human during the manipulation of the object by the human; and storing the grasp affordance for the object in a non-transitory computer readable storage medium for determining one or more grasping parameters for manipulating the object or other objects that are similar to the object.

2. The method of claim 1, wherein generating the grasp affordance for the object comprises:
determining the differences in the temperatures between the one or more portions in the thermal image and the one or more portions in the additional thermal image; and
defining the one or more portions of the object based on the differences in the temperatures satisfying a threshold.

3. The method of claim 2, wherein the grasp affordance for the object defines the one or more portions of the object touched by the human during the manipulation and defines additional portions of the object.

4. The method of claim 3, wherein the grasp affordance for the object comprises one or more geometric shapes that encompass the one or more portions and the additional portions.

5. The method of claim 1, further comprising:
assigning the grasp affordance to corresponding portions of the object in a non-thermographic image of the object, the non-thermographic image captured by a non-thermographic camera of the sensors of the robot;
wherein storing the grasp affordance for the object comprises storing the assignment of the grasp affordance to the corresponding portions of the object in the non-thermographic image of the object.

6. The method of claim 1, further comprising:
assigning the grasp affordance to corresponding portions of the object in a three dimensional model of the object;
wherein storing the grasp affordance for the object comprises storing the assignment of the grasp affordance to the corresponding portions of the object in the three dimensional model of the object.

7. The method of claim 1, further comprising:
determining an identifier of the object based on the data from the one or more of the sensors of the robot; and
assigning the grasp affordance to the identifier of the object.

8. The method of claim 1, further comprising:
determining, by the robot, an indication of the completion of the manipulation of the object by the human based on the data from the one or more sensors of the robot; and
selecting the thermal image for generating the grasp affordance based on determining the thermal image was captured following the indication of the completion of the manipulation of the object.

9. The method of claim 8, further comprising:
determining, by the robot, an indication of a start of the manipulation of the object by the human based on the data from the one or more sensors of the robot; and
selecting the additional thermal image for generating the grasp affordance based on determining the thermal image was captured prior to the indication of the start of the manipulation of the object.

10. The method of claim 1, further comprising:
generating grasping parameters for the object based on the grasp affordance; and
positioning a grasping end effector of the robot based on the grasping parameters.

11. The method of claim 1, further comprising:
generating a training example based on the grasp affordance; and
providing the training example for training of a convolutional neural network to determine grasping parameters for manipulating objects.

12. The method of claim 1, wherein detecting the object based on the data from the one or more of the sensors of the robot comprises detecting the object based on data from a non-thermographic camera of the sensors.

13. The method of claim 1, wherein detecting the object based on the data from the one or more of the sensors of the robot comprises detecting the object based on data from the thermographic camera.

14. A method, comprising:
capturing, by a thermographic camera, at least one thermal image of an object following manipulation of the object by a human;
generating, by one or more processors, a grasp affordance for the object based on one or more temperatures indicated by the thermal image, the grasp affordance defining one or more portions of the object touched by the human during the manipulation of the object by the human; and
storing the grasp affordance for the object in a non-transitory computer readable storage medium for determining one or more grasping parameters for one or more robots in manipulating the object or other objects that are similar to the object.

15. The method of claim 14, wherein generating the grasp affordance for the object comprises:
defining the one or more portions of the object based on the temperatures indicated in the one or more portions in the thermal image being at least a threshold temperature greater than the temperatures indicated in other portions of the thermal image.

16. The method of claim 15, wherein generating the grasp affordance for the object further comprises:
defining the one or more portions of the object based on the one or more portions being at least a threshold size.

17. The method of claim 14, further comprising:
determining, by the one or more processors, an indication of completion of the manipulation of the object; and
selecting, by the one or more processors, the thermal image for generating the grasp affordance based on determining the thermal image was captured following the indication of the completion of the manipulation of the object.

18. The method of claim 14, further comprising:
generating grasping parameters for the object based on the grasp affordance; and
positioning a grasping end effector of one of the robots based on the grasping parameters.

19. The method of claim 14, further comprising:
capturing, by the thermographic camera, at least one additional thermal image of the object, the additional thermal image of the object captured either before the manipulation of the object by the human or after expiration of a threshold amount of time following completion of the manipulation of the object by the human;

wherein generating the grasp affordance for the object based on the one or more temperatures indicated by the thermal image comprises:
  determining differences between the one or more temperatures indicated by the thermal image and one or more temperatures indicated by the additional thermal image; and
  defining the one or more portions of the object for the grasp affordance based on the differences in the temperatures for the one or more portions satisfying a threshold.

20. A system, comprising:
a thermographic camera capturing thermal images;
one or more processors executing instructions stored in a non-transitory computer readable storage medium, wherein execution of the instructions cause the one or more processors to:
  receive at least one thermal image of the thermal images, the thermal image captured by the thermographic camera following completion of manipulation of the object by a human;
  generate a grasp affordance for the object based on one or more temperatures indicated by the thermal image, the grasp affordance defining one or more portions of the object touched by the human during the manipulation of the object by the human; and
  store the grasp affordance for the object in a non-transitory computer readable storage medium for determining one or more grasping parameters for one or more robots in manipulating the object or other objects that are similar to the object.

21. The system of claim 20, further comprising:
a robot, wherein the thermographic camera is mechanically coupled to the robot.

* * * * *